US009945161B2

United States Patent
Iacovoni et al.

(10) Patent No.: US 9,945,161 B2
(45) Date of Patent: Apr. 17, 2018

(54) LOCK SYSTEM FOR DUAL VEHICLE CLOSURES

(71) Applicant: Ford Global Technologies, LLC, Dearborn, MI (US)

(72) Inventors: Donald P. Iacovoni, Plymouth, MI (US); Paul L. Heirtzler, Jr., Northville, MI (US); Kosta Papanikolaou, Huntington Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/077,063

(22) Filed: Mar. 22, 2016

(65) Prior Publication Data
US 2017/0275931 A1    Sep. 28, 2017

(51) Int. Cl.
| | | |
|---|---|---|
| B62D 25/00 | (2006.01) | |
| E05B 83/20 | (2014.01) | |
| B62D 25/12 | (2006.01) | |
| E05B 85/00 | (2014.01) | |
| E05B 81/04 | (2014.01) | |

(52) U.S. Cl.
CPC .............. *E05B 83/20* (2013.01); *B62D 25/12* (2013.01); *E05B 81/04* (2013.01); *E05B 85/00* (2013.01)

(58) Field of Classification Search
CPC .......... E05B 83/20; E05B 81/04; E05B 85/00; B62D 25/12
USPC .......... 296/51, 53, 56; 49/71, 73.1, 371, 142
See application file for complete search history.

(56) References Cited

U.S. PATENT DOCUMENTS

| | | | | |
|---|---|---|---|---|
| 3,713,472 | A * | 1/1973 | Dozois ........................ | B60J 5/12 160/189 |
| 3,716,945 | A * | 2/1973 | Cooper .................... | B60J 5/106 296/56 |
| 4,413,854 | A | 11/1983 | Hirshberg | |
| 4,688,844 | A | 8/1987 | Hirose et al. | |
| 6,007,139 | A * | 12/1999 | Shave ....................... | B60J 5/101 296/146.8 |
| 6,068,327 | A * | 5/2000 | Junginger ................ | B60J 5/101 160/213 |
| 6,174,015 | B1 | 1/2001 | Shave | |

(Continued)

FOREIGN PATENT DOCUMENTS

| | | |
|---|---|---|
| DE | 4400374 A1 | 7/1995 |
| DE | 102006013735 A1 | 10/2006 |

(Continued)

OTHER PUBLICATIONS

Citroenet, "Citroen C2 Ingenious and Practical," 2003, 3 pages.

*Primary Examiner* — Jerry E Redman
(74) *Attorney, Agent, or Firm* — Jason Rogers; Price Heneveld LLP

(57) ABSTRACT

A vehicle includes a body structure having an opening, a liftgate panel movably mounted to the body adjacent the opening, and a decklid that is movably mounted to the liftgate. The vehicle includes a lock member that is movable to first, second, and third positions. The lock member locks the liftgate to the decklid when in the first position. The lock member locks the liftgate to the body structure in the second position. The lock member simultaneously locks both the liftgate and the decklid to the body structure when the lock member is in the third position.

18 Claims, 7 Drawing Sheets

(56) References Cited

U.S. PATENT DOCUMENTS

| | | | | |
|---|---|---|---|---|
| 6,318,782 B1* | 11/2001 | Suzuki | ............. | B60J 5/106 296/106 |
| 6,418,667 B1* | 7/2002 | Moon | ............. | B60J 5/101 16/DIG. 17 |
| 6,454,341 B2* | 9/2002 | Tolinski | ............. | B60J 1/1861 296/106 |
| 6,471,284 B2* | 10/2002 | Landmesser | ............. | B60J 5/106 296/146.8 |
| 6,505,882 B1* | 1/2003 | Morbach | ............. | B60J 5/12 296/146.11 |
| 7,334,833 B2* | 2/2008 | Koelbl | ............. | B60J 5/101 296/146.8 |
| 7,631,921 B2 | 12/2009 | Lewis et al. | | |
| 7,703,827 B2* | 4/2010 | Bunsmann | ............. | B60J 1/1823 296/107.07 |
| 7,905,533 B2* | 3/2011 | Andre | ............. | B60J 5/101 296/146.5 |
| 8,174,146 B2 | 5/2012 | Cheal et al. | | |
| 8,215,691 B2* | 7/2012 | Ewing | ............. | B60R 5/04 293/117 |
| 8,333,426 B2* | 12/2012 | Kitayama | ............. | B60J 7/043 296/216.02 |
| 8,376,449 B2* | 2/2013 | Kitayama | ............. | B60J 1/1869 296/146.8 |
| 9,067,626 B1 | 6/2015 | Anderson | | |
| 9,428,944 B1* | 8/2016 | Elia | ............. | B60J 5/107 |
| 9,637,955 B2* | 5/2017 | Elia | ............. | E05B 85/045 |
| 2003/0038497 A1* | 2/2003 | Fitzgerald | ............. | B60R 5/04 296/39.1 |
| 2006/0152029 A1* | 7/2006 | Tomasson | ............. | B60J 5/103 296/51 |
| 2007/0046060 A1* | 3/2007 | Werner | ............. | B60J 1/1884 296/51 |
| 2009/0102221 A1* | 4/2009 | Andre | ............. | B60J 5/12 296/56 |
| 2009/0140544 A1* | 6/2009 | Pollak | ............. | B60J 5/103 296/186.3 |
| 2009/0243329 A1* | 10/2009 | Hustyi | ............. | B60J 1/1846 296/76 |
| 2012/0242104 A1* | 9/2012 | Babbage | ............. | B60J 7/1642 296/26.06 |
| 2014/0097644 A1* | 4/2014 | Kurita | ............. | B62D 25/02 296/193.08 |
| 2016/0193903 A1* | 7/2016 | Warburton | ............. | B60J 5/103 296/51 |

FOREIGN PATENT DOCUMENTS

| | | |
|---|---|---|
| EP | 0718134 B1 | 6/1996 |
| EP | 1652708 A1 | 5/2006 |
| GB | 2462662 B | 2/2010 |
| JP | 4051737 B2 | 2/2008 |
| WO | 2009109147 A1 | 9/2009 |
| WO | 2009109149 A1 | 9/2009 |

* cited by examiner

LOCK SYSTEM FOR DUAL VEHICLE CLOSURES

FIELD OF THE INVENTION

The present invention generally relates to motor vehicles, and in particular to a motor vehicle having a dual gate including a lock out feature that simultaneously locks a liftgate and a decklid to a vehicle body, locks only the liftgate to the vehicle body, or locks the liftgate to the decklid only.

BACKGROUND OF THE INVENTION

Various types of dual gate vehicle closures have been developed to close off a trunk/rear hatch opening of a vehicle. Typically, dual closures for vehicles include a liftgate panel that is movably mounted to a vehicle body, and a decklid panel that is movably mounted to the liftgate panel. The decklid panel can be opened by itself in a manner that is somewhat similar to a conventional trunk lid. The decklid panel and the liftgate panel can also be opened together in a manner that is somewhat similar to that of a conventional rear hatch of a hatchback. However, known systems may suffer from various drawbacks.

SUMMARY OF THE INVENTION

One aspect of the present disclosure is a dual closure system for vehicles including a vehicle body structure having an access opening. The dual closure system also includes a liftgate panel having first and second opposite edge portions. The liftgate panel is movably connected to the vehicle body structure adjacent to the access opening. A decklid or tailgate panel is movably connected to the liftgate panel adjacent the second edge portion of the liftgate panel whereby the decklid panel is adapted to move relative to the liftgate panel. A movable lock member moves between first, second, and third positions. When the movable lock member is in the first position, the movable lock member interconnects the liftgate panel and the decklid panel and prevents movement of the decklid panel relative to the liftgate panel without preventing movement of the liftgate panel relative to the vehicle body structure. When the movable lock member is in the first position, the liftgate panel and the decklid panel can be opened relative to the vehicle body structure. When the movable lock member is in the second position, the movable lock member interconnects the liftgate panel and the vehicle body structure and prevents movement of the liftgate panel relative to the vehicle body structure without preventing movement of the decklid panel relative to the liftgate panel. When the movable lock member is in the second position, the decklid panel can be opened relative to the liftgate panel. When the movable lock member is in the third position, the movable lock member interconnects the liftgate panel and the decklid panel to the vehicle body structure and prevents movement of the liftgate panel and the decklid panel relative to the vehicle body structure.

Another aspect of the present invention is a vehicle including a body having an opening, a liftgate panel movably mounted to the body adjacent the opening, and a decklid that is movably mounted to the liftgate. The vehicle includes a lock member that is movable to first, second, and third positions. The lock member locks the liftgate only to the decklid when in the first position. The lock member locks the liftgate only to the body in the second position, and locks the liftgate and the decklid to the body when the lock member is in the third position.

Another aspect of the present invention is a method of closing off an opening in a vehicle body structure. The method includes providing a vehicle including a body structure having an opening, a liftgate movably mounted to the body structure, a decklid movably mounted to the liftgate, and a movable lock member. The method includes causing the lock member to engage the liftgate and the decklid such that the decklid cannot move relative to the liftgate when in a liftgate mode. The method also includes causing the lock member to engage the body structure and the liftgate such that the liftgate cannot move relative to the body structure when in a decklid mode. The method further includes causing the lock member to simultaneously engage the body structure, the liftgate, and the decklid such that the liftgate and the decklid cannot move relative to the body structure when in a locked mode.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
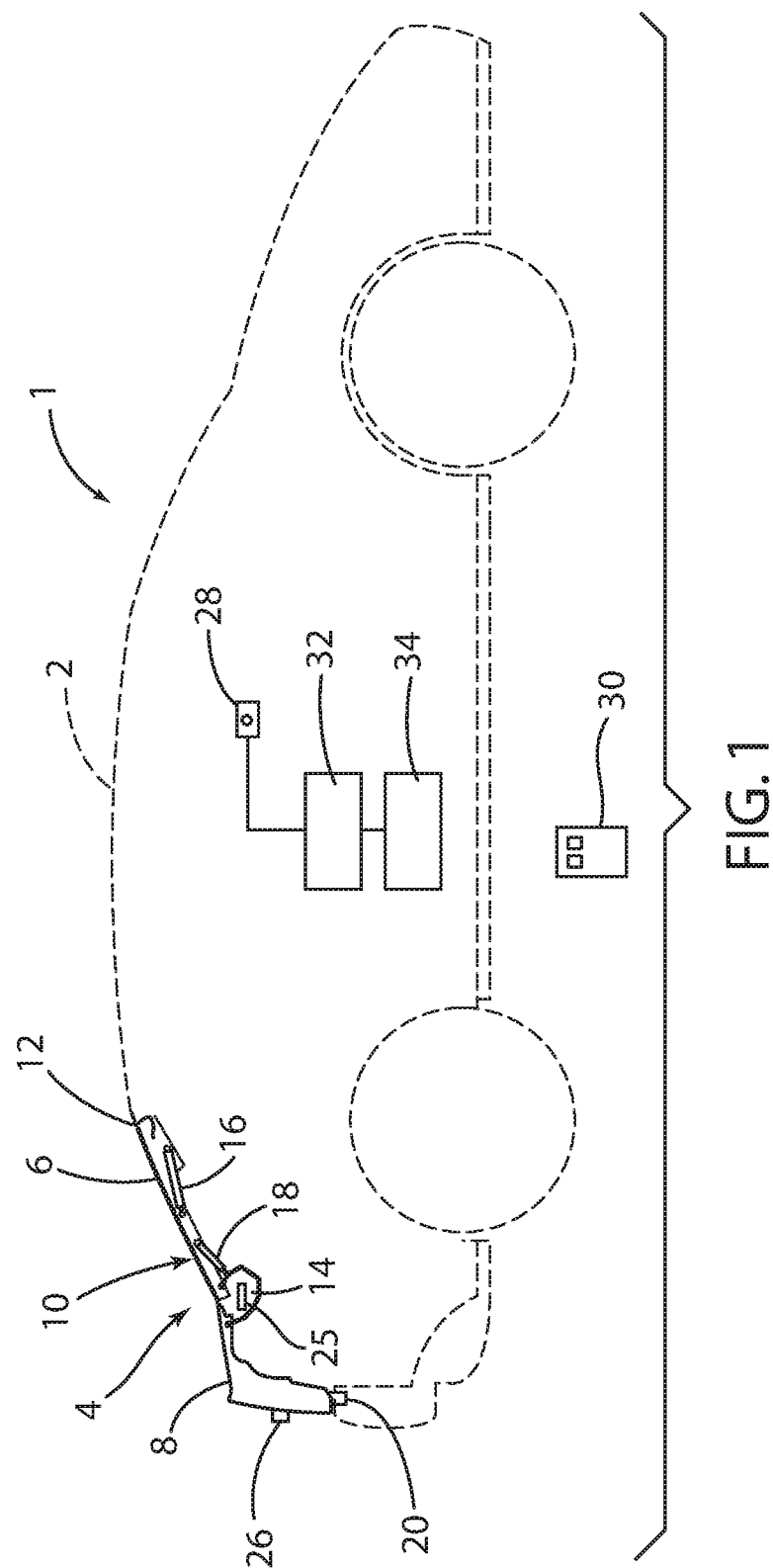
FIG. 1 is a partially schematic side elevational view of a vehicle including a dual closure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise This application is related to U.S. patent application Ser. No. 15/071,649 entitled "POWERED DUAL CLOSURE SYSTEM FOR VEHICLES," filed on Mar. 16, 2016, now U.S. Pat. No. 9,783,028 the disclosure of which is hereby incorporated herein by reference in its entirety.

Figure 2:
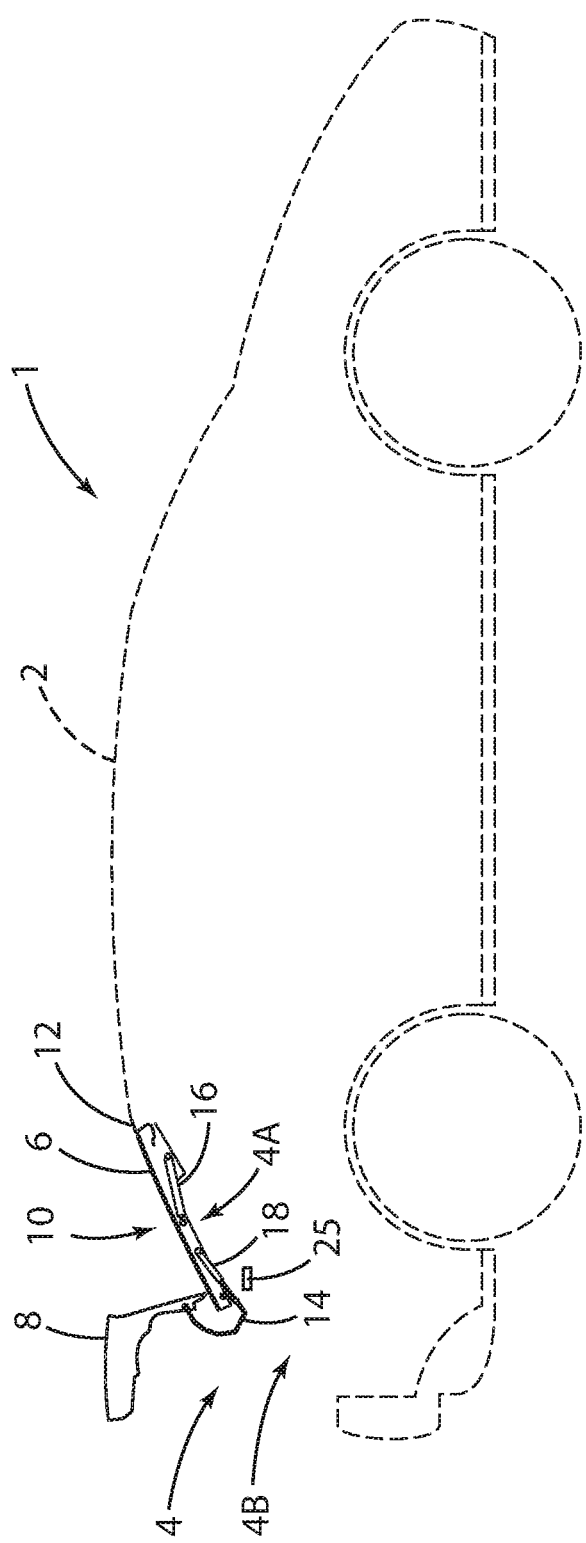
FIG. 2 is a side elevational view of the vehicle of FIG. 1 showing the decklid in an open position.
Figure 3:
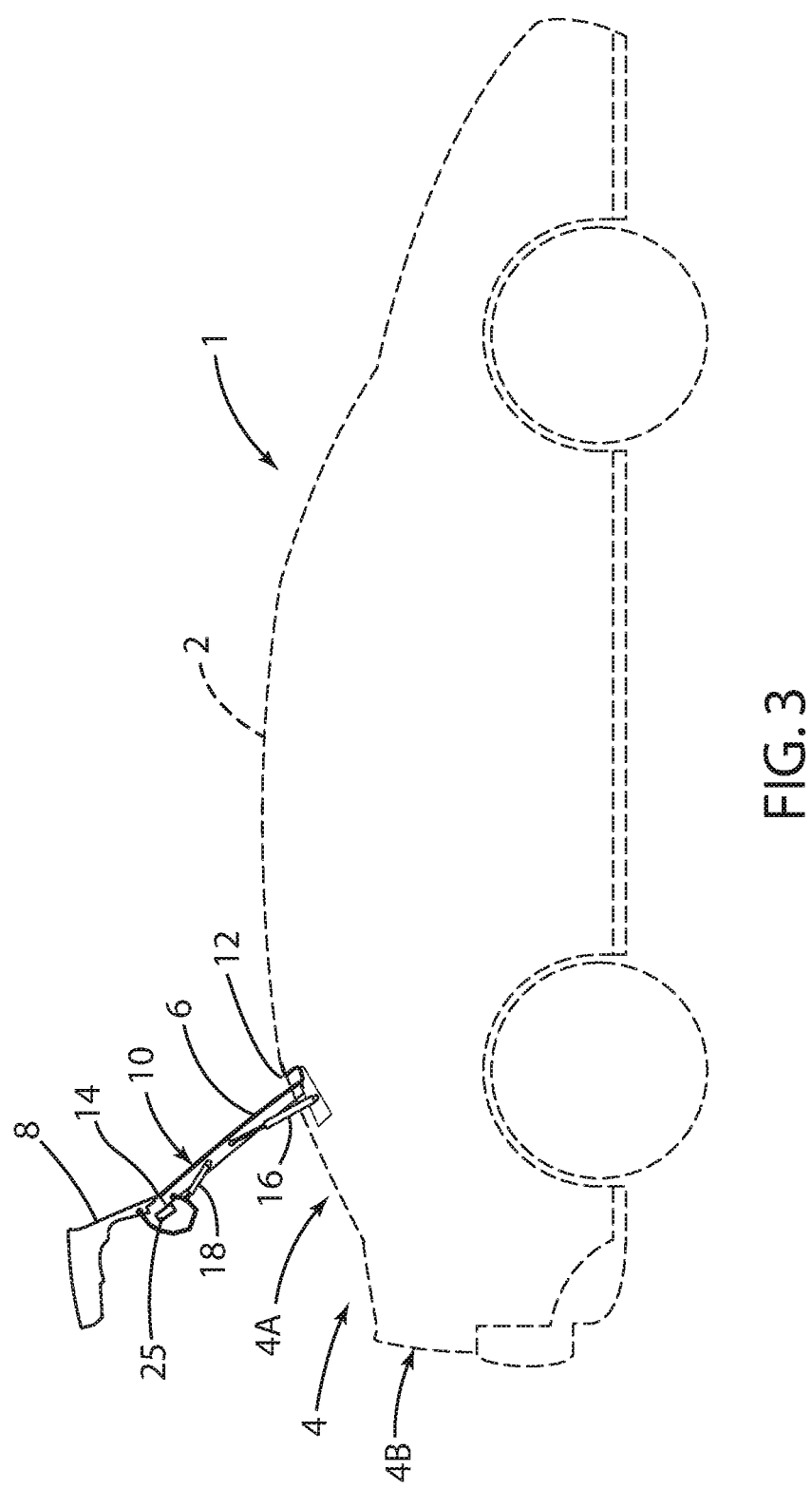
FIG. 3 is a side elevational view of the vehicle of FIG. 1 showing the liftgate in an open position.

With reference to FIGS. 1-3, a vehicle 1 includes a body structure 2 having a rear access opening 4 having an upper portion 4A and a lower portion 4B. A panel assembly 10 is movably mounted to the vehicle body. Panel assembly 10 may close off the entire rear opening 4 (FIG. 1), only the upper portion 4A of opening 4 (FIG. 2), or open to provide access through both upper and lower portions 4A and 4B of opening 4 (FIG. 3). Panel assembly 10 includes a liftgate panel 6 and a decklid or tailgate panel 8. Liftgate 6 is movably mounted to vehicle body structure 2 by a first hinge 12, and decklid 8 is movably connected to liftgate 6 by a second hinge 14. First struts 16 may generate a moment acting on liftgate 6 to facilitate rotation of liftgate 6 about first hinge 12, and second struts 18 operably interconnect liftgate 6 and decklid 8. Struts 18 may generate a moment about second hinge 14 tending to rotate decklid 8 to an open position (FIG. 2) relative to liftgate 6. The struts 16 and 18 may comprise gas springs or the like that assist rotation of decklid 8 relative to liftgate panel 6 to permit manual opening of decklid 8 to the position shown in FIG. 2. Similarly, the struts 16 may comprise gas springs or the like that assist when opening liftgate panel 6 to the open position as shown in FIG. 3. Alternatively, struts 16 and 18 may comprise linear powered actuators that provide for powered opening and/or closing of decklid 8 by itself (FIG. 2), or powered opening of both liftgate panel 6 and decklid 8 (FIG. 3). Vehicle 1 preferably includes a pair of struts 16 and a pair of struts 18, wherein the struts are located on left and ride sides of vehicle 1. Details concerning powered actuators that may be utilized to open and close panel assembly 10 may be found in the above-identified U.S. patent application Ser. No. 15/071,649 entitled "POWERED DUAL CLOSURE SYSTEM FOR VEHICLES," now U.S. Pat. No. 9,783,028.

A latch mechanism 20 (FIG. 1) may be utilized to retain the panel assembly 10 in a closed position as shown in FIG. 1. As discussed in more detail below, a lock assembly 25 selectively interconnects the liftgate panel to the tailgate panel when in a liftgate mode to permit opening of liftgate 6 and decklid 8 together as a unit (FIG. 3). The lock assembly 25 locks the liftgate panel 6 to the vehicle body 2 when in a decklid mode (FIG. 2), and the lock assembly 25 selectively locks both the liftgate panel and the decklid 8 to the vehicle body structure 2 when the lock assembly 25 is in a locked mode.

Vehicle 1 may include a controller 32 and power supply 34. Exterior user input features such as push buttons 26 may be operably connected to the controller 32. Similarly, interior input features such as push buttons 28 may also be operably connected to controller 32. Furthermore, a remote wireless fob 30 may also be operably connected with controller 32. Push buttons 26 and 28, and fob 30 may include "open" and "close" buttons for both decklid mode and for liftgate mode, to allow a user to selectively open and close decklid 8 only (FIG. 2), or open and close liftgate 6 and decklid 8 together (FIG. 3), and to simultaneously lock liftgate 6 and decklid 8 to vehicle structure 2 in the closed position (FIG. 1). Controller 32 is operably connected to the lock assembly 25 and provides powered actuation/operation of the lock assembly 25 as described in more detail below. If the struts 16 and 18 comprise powered struts, controller 32 may also be operably connected to the struts 18 and 20 to provide for powered opening and/or closing of liftgate panel 6 and/or tailgate (decklid) panel 8.

Figure 4:
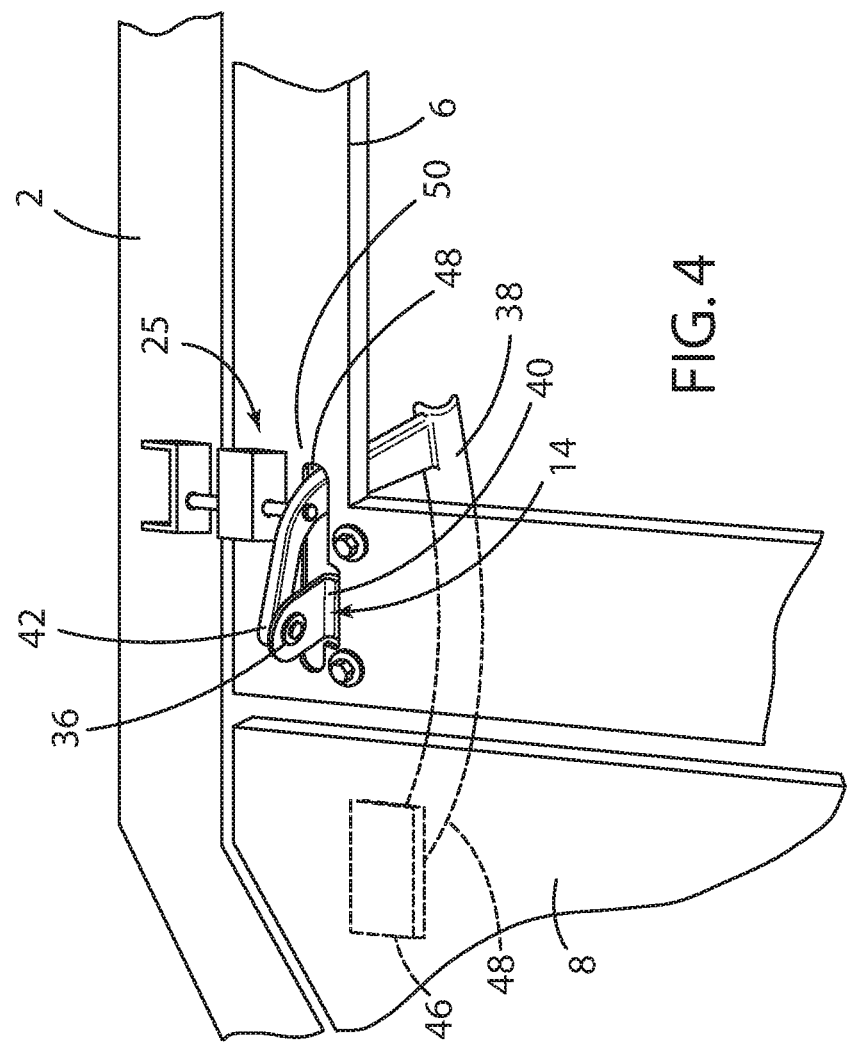
FIG. 4 is a partially fragmentary isometric view showing a hinge and lock interconnecting the liftgate and decklid of the vehicle of FIGS. 1-3.
Figure 5:
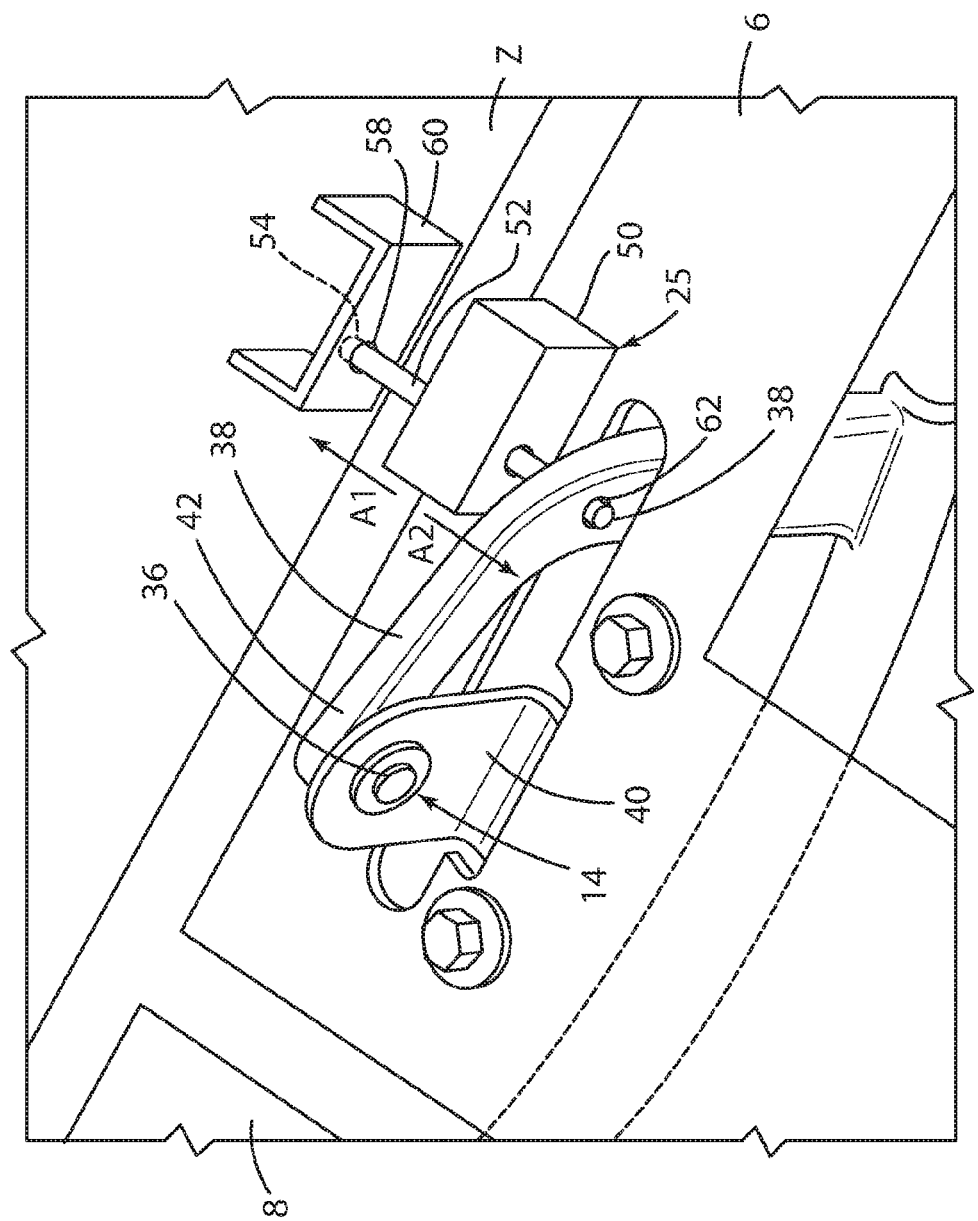
FIG. 5 is an enlarged view of the hinge and lock of FIG. 4.

With further reference to FIGS. 4 and 5, hinge 14 may include a pin or pivot member 36 that pivotably interconnects a first end 42 of curved hinge arm 38 to a bracket 40 which is fixed to liftgate 6. Second end 44 of hinge arm 38 is fixed to decklid 8 by a bracket 46. Hinge arm 38 passes through an opening 48 in liftgate panel 6. The hinge assembly 14 of FIGS. 4 and 5 comprises a left hand hinge. It will be understood that a pair of the hinge assemblies 14 disposed at left and right sides of vehicle 1 may be utilized to movably interconnect liftgate panel 6 and decklid 8. Various suitable hinge mechanisms are known in the art, and the present invention is not limited to the specific arrangement shown in FIGS. 4 and 5.

Lock assembly 25 includes a powered actuator 50 that shifts a lock pin 52 in first and second directions A1 and A2, respectively, between first and second actuated positions, and a center position. Powered actuator 50 may comprise a solenoid or an electric motor that is operably connected to lock pin 52 by a gear drive (not shown) or other suitable arrangement. Lock pin 52 includes a first end portion 54 that is received in an opening 58 of a bracket 60 or other structure of vehicle body structure 2 when powered actuator 50 is actuated to shift the lock pin 52 in the first direction A1 to the first actuated position. Second end 56 of lock pin 52 engages an opening 62 in hinge arm 38 when lock pin 52 is shifted in the second direction A2 to the second actuated position upon actuation of powered actuator 50. Powered actuator 50 is also configured to shift the lock pin 52 to a center or locked configuration/position in which lock pin 52 simultaneously engages the opening 62 in hinge arm 38 and the opening 58 in body structure 2. End portions 54 and/or 56 of lock pin 52 and/or openings 58 and/or 62 may have tapered surface portions to ensure tight engagement to prevent rattles or other unwanted movement.

Figure 6:
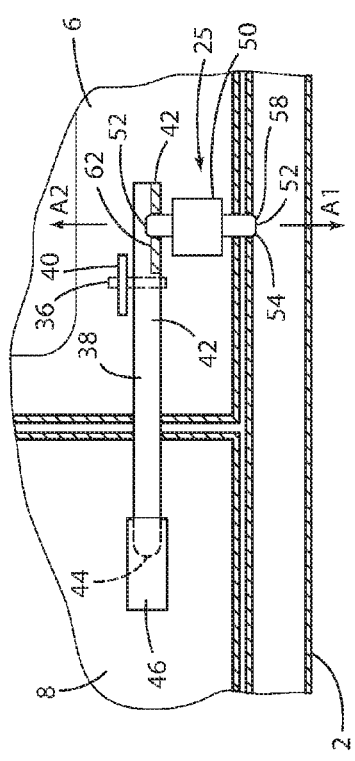
FIG. 6 is a partially schematic fragmentary view showing a locking pin interconnecting a vehicle body, liftgate and decklid.

When the panel assembly 10 is in a closed position as shown in FIG. 1, the powered actuator 50 of lock assembly 25 can be configured/actuated such that the lock pin 52 is in a locked mode or configuration in which the lock pin 52 simultaneously engages the opening 62 of hinge arm 38 and opening 58 in vehicle body structure 2. Because the powered actuator 50 is mounted to the liftgate panel 6, the lock pin 52 locks or interconnects the body structure 2, liftgate panel 6, and decklid 8 together. Thus, when the lock assembly 25 is in the locked mode of FIG. 6, the tailgate 8 cannot rotate relative to liftgate panel 6, and the liftgate panel 6 cannot move relative to the body structure 2. The powered actuator 50 may be actuated by pressing an exterior button 26, or by pressing an interior button 28, or by pressing a button to actuate wireless fob 30. During operation, the lock assembly 25 can be shifted to the locked mode of FIG. 6, and latch mechanism 20 can be simultaneously latched. This ensures that the panel assembly 10 does not shift relative to the vehicle body 2 during operation of vehicle 1.

As shown in FIG. 2, decklid 8 can be opened in a decklid mode. To open the decklid 8, a user pushes one of the buttons 26, 28, or actuates remote 30. The powered actuator 50 is configured to shift to a decklid mode (FIG. 7) in which lock pin 52 engages opening 58 of vehicle body structure 2.

Figure 7:
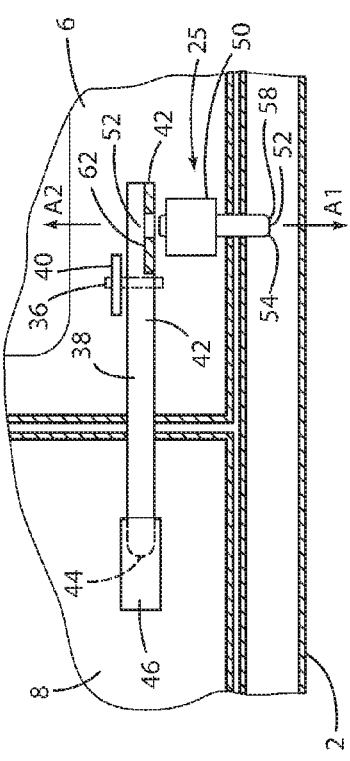
FIG. 7 is a partially schematic fragmentary view showing a first version of the lock mechanism in a decklid mode in which the pin locks the vehicle body and liftgate.

As shown in FIG. 7, second end 56 of lock pin 52 disengages opening 62 of hinge arm 38. Thus, in the decklid mode of FIG. 7 the liftgate panel 6 is interconnected or locked to vehicle body structure 2, but the decklid 8 can rotate relative to liftgate 6 upon release of latch 20. If struts 16 and 18 comprise pneumatic cylinders or the like, a user can select an "open in decklid mode" button 26 or 28 or wireless fob 30 to release latch 20 and shift lock assembly 25 to the decklid mode (FIG. 7). The user then grasps the decklid 8 and rotates it from the closed position (FIG. 1) to the open position (FIG. 2). A user can also grasp decklid 8 and rotate it back to the closed position of FIG. 1 when lock assembly 25 is in the decklid mode. If the struts 16 and 18 comprise powered actuators, controller 32 shifts powered actuator 50 to the decklid mode and unlatches latch 20 upon receiving an "open in decklid mode" input from buttons 26 or 28 or remote 30, and actuates second strut 18 to thereby open decklid 8. A user can select a "close in decklid mode" input to actuate strut 18 to close decklid 8 and shift lock assembly 25 to the locked mode. Powered actuator 50 may provide a signal to controller 32 indicating the mode of lock assembly 25. Similarly, switches or sensors (not shown) may be operably interconnected to lock pin 52 (FIGS. 6-8) to provide controller 32 with a signal indicating the position of lock pin 52. Buttons 26, 28 and fob 30 may have a single "close" input whereby controller 32 determines if actuation of struts 18 only is required to close decklid 8 depending on the present configuration/mode of lock pin 52.

Figure 8:
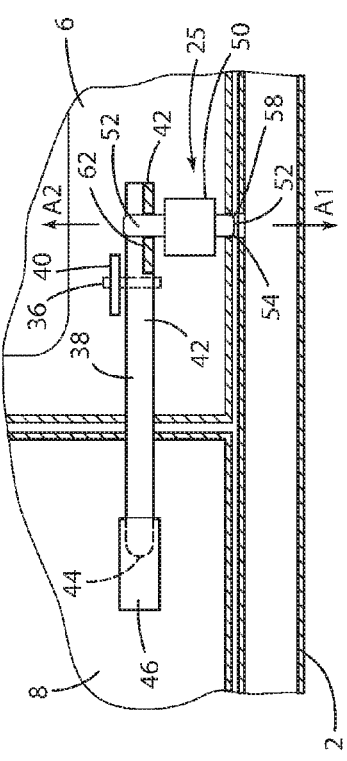
FIG. 8 is a partially schematic fragmentary view showing a first version of the lock mechanism in a liftgate mode in which a lock pin interconnects the liftgate and decklid.

As shown in FIG. 3, the liftgate and decklid 8 can be opened together in a liftgate mode. With further reference to FIG. 8, in the liftgate mode powered actuator 50 shifts lock pin 52 such that second end 56 of lock pin 52 engages opening 62 in hinge arm 38, and first end 54 of lock pin 52 is disengaged from opening 58 in vehicle body structure 2. Thus, when the lock assembly 25 is in the liftgate mode the lock pin 52 rigidly interconnects the liftgate 6 to the decklid 8 to prevent rotation about second hinge 14, but permits rotation of liftgate 6 relative to vehicle body structure 2 about hinge 12. A user can operate the panel assembly 10 utilizing "open in liftgate mode" push buttons 26, 28, or remote 30, thereby causing powered actuator 50 to shift the lock pin 52 to the position shown in FIG. 8, releasing latch mechanism 20, and actuating strut 16 if strut 16 comprises a powered actuator. If strut 16 is a powered actuator, the panel assembly 10 can be closed upon actuation of strut 16, thereby causing latch mechanism 20 to latch. The lock assembly 25 can then be shifted from the liftgate mode (FIG. 8) to the locked mode (FIG. 6) when the panel assembly 10 is in the closed position (FIG. 1).

Figure 9:
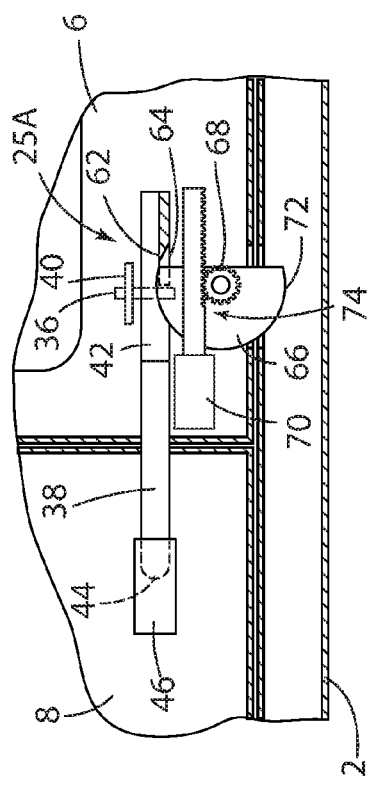
FIG. 9 is a partially schematic fragmentary view showing a locking wedge interconnecting a vehicle body, liftgate and decklid.
Figure 10:
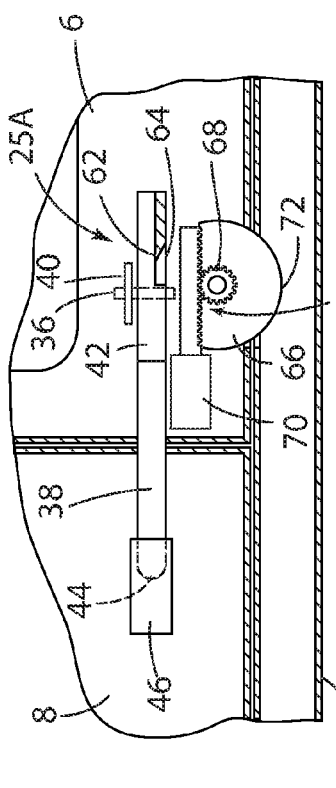
FIG. 10 is a partially schematic fragmentary view showing a first version of the lock mechanism in a decklid mode in which the wedge locks the vehicle body and liftgate.
Figure 11:
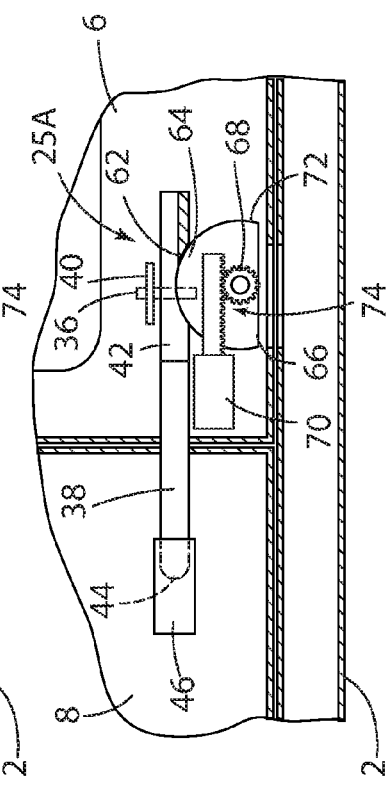
FIG. 11 is a partially schematic fragmentary view showing a second version of the lock mechanism in a liftgate mode in which a lock wedge interconnects the liftgate and decklid.

With further reference to FIGS. 9-11, a locking mechanism 25A includes a lock wedge 72 that is shifted by a powered actuator 70. The lock wedge 72 can be shifted to a locked configuration or mode (FIG. 9), a decklid configuration or mode (FIG. 10), and a liftgate configuration or mode (FIG. 11). Lock wedge 72 may be configured to selectively engage slots or engagement surfaces 64 and 66 in hinge arm 38 and body structure 2, respectively. When the lock wedge 72 is in the locked mode shown in FIG. 9, the liftgate 6, decklid 8, and body structure 2 are all locked together such that relative movement between these components is prevented. When the lock assembly 25A is in the decklid mode as shown in FIG. 10, the lock wedge 72 locks the liftgate 6 to the vehicle body structure 2, but permits movement of decklid 8 relative to liftgate 6. When the lock assembly 25A is in the liftgate configuration or mode (FIG. 11), the lock wedge 72 interconnects the liftgate 6 and the decklid 8 such that the decklid 8 cannot relative to liftgate 6, but permitting movement of liftgate 6 relative to body structure 2. Operation of the powered actuator 70 and lock wedge 72 shown in FIGS. 9-11 corresponds to the operation of powered actuator 50 and the lock pin 52 described in more detail above in connection with FIGS. 6-8, respectively. The slots or engagement surfaces 64 and 66 and/or lock wedge 72 can be configured to provide a tapered wedge-type engagement to tightly interconnect lock wedge 72 with engagement surfaces 64 and 66 to thereby prevent relative movement between liftgate 6, decklid 8, and body structure 2 as may be required.

A drive assembly 74 operably connects the powered actuator 70 to the lock wedge 72 and selectively rotates the lock wedge 72 about a pin or access 68 relative to the liftgate panel 6. The drive assembly 74 may comprise gears or other suitable mechanical interconnection arrangement. The powered actuator 70 may comprise an electric stepper motor that is reversible to permit rotation of locking wedge 72 in first and second directions. Powered actuator 70 is configured to provide for rotation of lock wedge 72 to the specific positions shown in FIGS. 9-11. Switches or other suitable sensors (not shown) may be utilized to generate a signal to controller 32 corresponding to the positions of locking wedge 72 shown in FIGS. 9-11.

The locking assemblies 25 and 25A described above permit the liftgate 6 to be locked to vehicle body structure 2 while simultaneously releasing decklid 8 to permit opening and closing of the decklid 8 in the decklid mode as shown in FIG. 2. Alternatively, the lock assemblies 25 and 25A can be utilized to lock the liftgate 6 to the decklid 8 without locking the liftgate 6 to body structure 2 to permit opening and closing of panel assembly 10 in a liftgate mode of operation as shown in FIG. 3. Also, the lock assemblies 25 and 25A can be utilized to interconnect the liftgate 6 and decklid 8 to the vehicle body structure 2 to ensure that the panel assembly 10 remains in the closed position as shown in FIG. 1.

The lock pin 52 may be driven by a single powered actuator 50, and the lock wedge 72 may be driven by a single powered actuator 70. Alternatively, first and second powered actuators may be utilized to drive the lock pin 52 in first and second directions, respectively. Similarly, first and second actuators may be utilized to drive lock wedge 72 in first and second directions, respectively. Also, lock pin 52 is preferably a single, one piece member, and lock wedge 72 is also preferably a single one piece member. However, lock pin 52 may comprise two or more components that engage openings 58 and 62. Similarly, lock wedge 72 may comprise two or more separate components that engage the slots or engaging surfaces 64 and 66.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A dual closure system for vehicles comprising:
a vehicle body structure having an access opening;
a liftgate panel having first and second opposite edge portions, wherein the liftgate panel is movably connected to the vehicle body structure adjacent the access opening;
a decklid panel movably connected to the liftgate panel adjacent the second edge portion of the liftgate panel whereby the decklid panel is adapted to move relative to the liftgate panel; and:

a lock member movably mounted to the liftgate panel and movable between at least first, second, and third positions, and wherein:

when the movable lock member is in the first position, the movable lock member interconnects the liftgate panel and the decklid panel and prevents movement of the decklid panel relative to the liftgate panel without preventing movement of the liftgate panel relative to the vehicle body structure, whereby the liftgate panel and the decklid panel can be opened relative to the vehicle body structure in a liftgate mode;

when the movable lock member is in the second position, the movable lock member interconnects the liftgate panel and the vehicle body structure and prevents movement of the liftgate panel relative to the vehicle body structure, without preventing movement of the decklid panel relative to the liftgate panel, whereby the decked panel can be opened relative to the liftgate panel in a decklid mode;

when the movable lock member is in the third position, the movable lock member interconnects the liftgate panel and the decklid panel to the vehicle body structure and prevents movement of the liftgate panel and the decklid panel relative to the vehicle body structure.

2. The dual closure system of claim 1, wherein:
the movable lock member comprises a lock pin that translates linearly.

3. The dual closure system of claim 2, wherein:
the lock pin is movably mounted to the liftgate panel.

4. The dual closure system of claim 2, wherein:
the decklid panel includes a first receiving structure;
a first end of the lock pin engages the first receiving structure when the lock pin is in the first position; and
at least one of the first receiving structure and the first end of the lock pin are tapered.

5. The dual closure system of claim 4, wherein:
the vehicle body structure includes a second receiving structure;
a second end of the lock pin engages the second receiving structure when the lock pin is in the second position; and
at least one of the second receiving structure and the second end of the lock pin are tapered.

6. The dual closure system of claim 1, wherein:
the movable lock member comprises a rotating locking disk.

7. The dual closure system of claim 6, wherein:
the locking disk is rotatably mounted to the liftgate panel.

8. The dual closure system of claim 6, wherein:
the decklid panel includes a first receiving structure;
a first portion of the locking disk engages the first receiving structure when the locking disk is in the first position; and
at least one of the first receiving structure and the first portion of the locking disk are tapered.

9. The dual closure system of claim 8, wherein:
the vehicle body structure includes a second retaining structure;
a second portion of the locking disk engages the second receiving structure when the locking disk is in the second position; and
at least one of the second receiving structure and the second portion of the locking disk are tapered.

10. A dual closure system for vehicles comprising:
a vehicle body structure having an access opening;
a liftgate panel having first and second opposite edge portions, wherein the liftgate panel is movably connected to the vehicle body structure adjacent the access opening;
a decklid panel movably connected to the liftgate panel adjacent the second edge portion of the liftgate panel whereby the decklid panel is adapted to move relative to the liftgate panel; and:
a movable lock member that is movable between at least first, second, and third positions, and wherein:
when the movable lock member is in the first position, the movable lock member interconnects the liftgate panel and the decklid panel and prevents movement of the decklid panel relative to the liftgate panel without preventing movement of the liftgate panel relative to the vehicle body structure, whereby the liftgate panel and the decklid panel can be opened relative to the vehicle body structure in a liftgate mode;
when the movable lock member is in the second position, the movable lock member interconnects the liftgate panel and the vehicle body structure and prevents movement of the liftgate panel relative to the vehicle body structure, without preventing movement of the decklid panel relative to the liftgate panel, whereby the decked panel can be opened relative to the liftgate panel in a decklid mode;
when the movable lock member is in the third position, the movable lock member interconnects the liftgate panel and the decklid panel to the vehicle body structure and prevents movement of the liftgate panel and the decklid panel relative to the vehicle body structure;
an electrically powered actuator operably connected to the movable lock member, wherein the electrically powered actuator is configured to shift the movable lock member to a selected one of the first, second, and third positions and
a controller that is configured to actuate the electrically powered actuator when the controller receives a signal from one or more of an exterior switch, an interior switch, a wireless signal from a remote wireless fob.

11. The dual closure system of claim 1, wherein:
the first edge portion of the liftgate panel is pivotably connected to the vehicle body structure by a first hinge; and:
the decklid panel is pivotably connected to the second edge portion of the liftgate panel by a second hinge.

12. A vehicle, comprising:
a body;
a liftgate movably mounted to the body adjacent an opening therein;
a decklid movably mounted to the liftgate; and
a lock member movably mounted to the liftgate and locking the liftgate only to the decklid when in a first position, and locking the liftgate only to the body in a second position, and locking the liftgate and the decklid to the body in a third position.

13. The vehicle of claim 12, wherein:
the lock member comprises a lock pin that translates linearly between the first, second, and third positions.

14. The vehicle of claim 13, wherein:
the lock pin is movably mounted to the liftgate.

15. The vehicle of claim 12, wherein:
the lock member comprises a rotating member.

16. The vehicle of claim 15, wherein:
the lock member is rotatably mounted to the liftgate.

17. The vehicle of claim 12, wherein:
at least a selected one of the lock member, the liftgate, and the decklid includes a tapered engagement surface configured to guide the lock member during engagement with the liftgate alone, the decklid alone, or the liftgate and decklid taken together.

18. The vehicle of claim 12, including:
an electrically powered actuator configured to selectively shift the lock member to the first, second, and third positions.

* * * * *